Sept. 2, 1952  A. B. JACOBSEN  2,609,533
ELECTRICAL MEASURING SYSTEM
Filed March 22, 1945  3 Sheets-Sheet 1
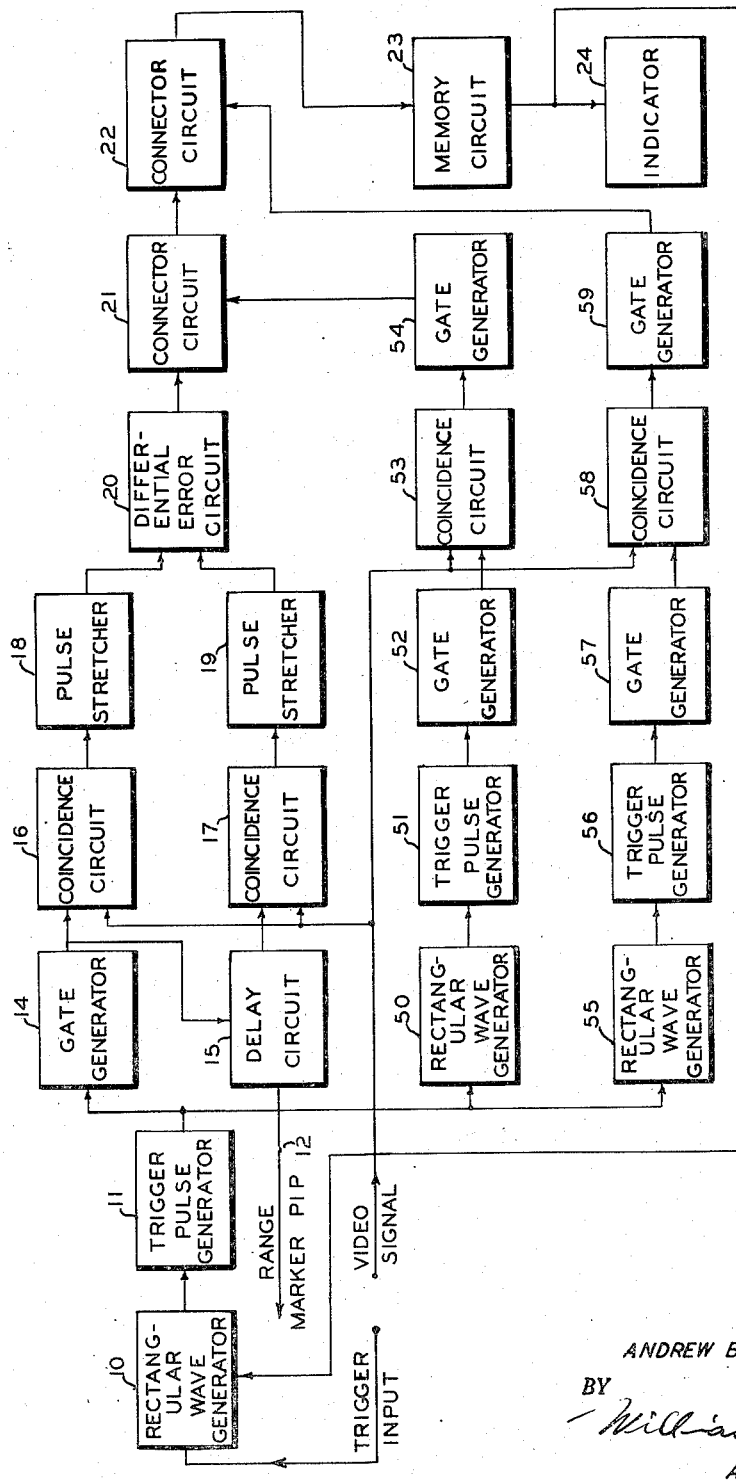
INVENTOR.
ANDREW B. JACOBSEN
BY
ATTORNEY Sept. 2, 1952 A. B. JACOBSEN 2,609,533
ELECTRICAL MEASURING SYSTEM
Filed March 22, 1945 3 Sheets-Sheet 2
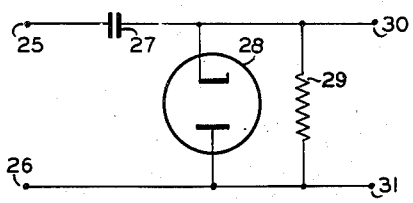
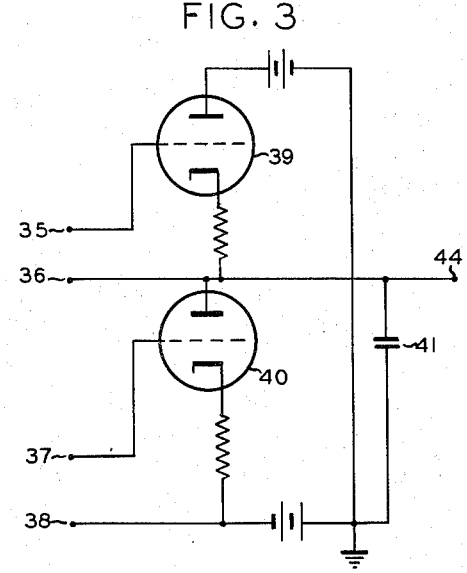
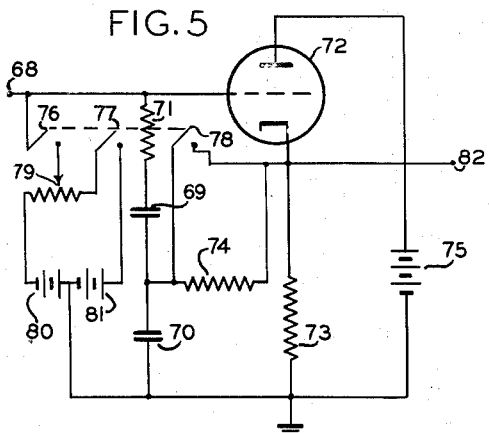
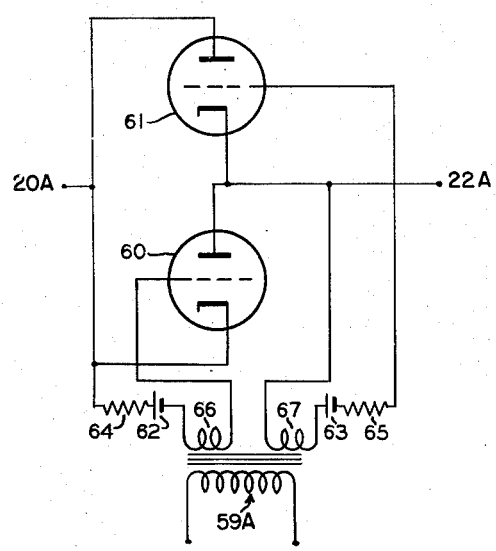
INVENTOR.
ANDREW B. JACOBSEN
BY
William D. Hall
ATTORNEY Sept. 2, 1952 — A. B. JACOBSEN — 2,609,533
ELECTRICAL MEASURING SYSTEM
Filed March 22, 1945 — 3 Sheets-Sheet 3

INVENTOR.
ANDREW B. JACOBSEN
BY William D. Hall
ATTORNEY

Patented Sept. 2, 1952

2,609,533

UNITED STATES PATENT OFFICE 2,609,533

ELECTRICAL MEASURING SYSTEM

Andrew B. Jacobsen, Somerville, Mass., assignor, by mesne assignments, to the United States of America as represented by the Secretary of War Application March 22, 1945, Serial No. 584,233

5 Claims. (Cl. 343—13)

This invention relates generally to an electrical circuit and more particularly to a circuit for decoding received radio frequency pulses and for determining the range of the apparatus emitting said pulses.

In one type of navigational system, a beacon, usually in a fixed location, is interrogated by radio pulses from a shipborne or airborne interrogating device. On being interrogated, the beacon transmits a coded series of radio pulses. The interrogating ship or plane carries a responding device which will respond only to the code of a preselected beacon and will indicate the range of said beacon. If the interrogating device transmits a directional beam of radio energy, the azimuth of the beacon with respect to the interrogator may also be determined by conventional methods.

One object of this invention is to provide a circuit which will respond only to a series of pulses arranged in a predetermined code and which will indicate the range of the responding beacon. It is also an object of this invention to provide a continuous indication of said range although the beacon is triggered intermittently.

Other objects of my invention will become apparent from the following description taken in connection with the accompanying drawing in which:

Fig. 1 is a block diagram of a circuit embodying the principles of this invention;

Fig. 2 is a diagram of a pulse stretcher circuit;

Fig. 3 is a diagram of a differential error circuit;

Fig. 4 is a diagram of a connector circuit;

Fig. 5 is a diagram of a memory circuit; and

Figure 6:
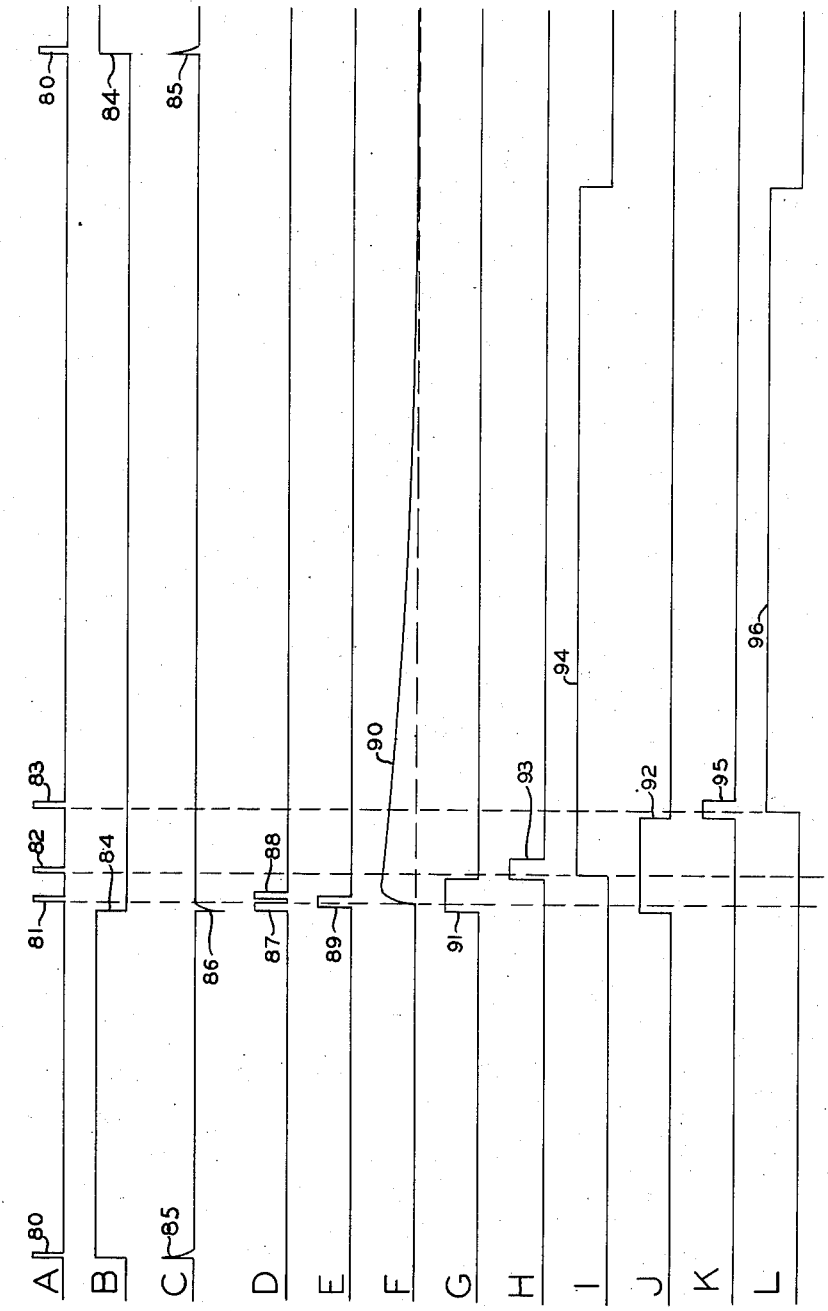
Fig. 6 shows a group of curves illustrating the operation of the invention.

Referring now more particularly to Fig. 1, rectangular wave generator 10 is supplied with an input from the transmitter (not shown) which transmits a radio pulse to interrogate the fixed beacon. Generator 10 produces a rectangular wave, the width of which is determined by a bias supplied from memory circuit 23 to be described subsequently. Such rectangular wave generators are well known to those skilled in the art, an example being described on pages 176 and 177 of "Ultra-High Frequency Techniques" written by Brainerd, Koehler, Reich, and Woodruff, published by D. Van Nostrand Co., Inc., in July of 1942.

Another rectangular wave generator for producing a rectangular wave, the width of which is determined by a bias, is the circuit known as the phantastron. This circuit comprises a pentagrid tube connected so that its operation is very similar to a cathode coupled multivibrator, the plate section of said tube being the normally off "tube" while the screen grid section is normally the on "tube." A condenser is placed in the plate circuit of said tube and is caused to discharge linearly, enabling the duration of the resulting pulse to be varied in proportion to changes of applied control voltage. The phantastron circuit is fully set forth in Massachusetts Institute of Technology Radiation Laboratory Report No. 63–21, dated August 21, 1943, written by Kelner, Hughes, Berg, Hinkle, and Chance, and entitled "An Adaptation of the Phantastron Delay Multivibrator Circuit to the 6SA7 Tube."

The output of generator 10 is supplied to trigger pulse generator 11 which may be a conventional differentiating circuit. The output of generator 11 is supplied to gate generator 14 which produces square waves, rectangular wave generator 50, and rectangular wave generator 55, all of which may be similar in construction to generator 10. The output of generator 14 is applied to coincidence circuit 16 and also to coincidence circuit 17 through delay circuit 15. Delay circuit 15 is a conventional delay network, the midpoint of which is tapped to supply a range marker pip to output 12 which may be used to indicate range on a cathode ray tube. Circuits 16 and 17 are also supplied with a video signal which is received from the fixed beacon as a result of the interrogation. Circuits 16 and 17 are conventional coincidence circuits which will not permit passage of the video signal unless a gate pulse occurs simultaneously therewith. Such circuits are conventional and may consist of electron tubes so biased that either video or gate pulse separately will not permit an increase in plate current but when they occur simultaneously such action takes place.

The outputs of coincidence circuits 16 and 17 are applied to pulse stretcher circuits 18 and 19 respectively. Pulse stretcher circuits 18 and 19 serve to widen the output from circuits 16 and 17.

Fig. 2 shows a circuit which can be used for pulse stretcher circuits 18 and 19. In Fig. 2, a negative pulse applied between terminals 25 and 26 will charge the capacitor 27 rapidly as tube 28 will conduct current in this direction. When the pulse is removed, condenser 27 discharges through resistor 29 which has a large amount of resistance. Thus, the time required for discharge is longer than the time required for charge and a widened pulse is produced between terminals 30 and 31.

Referring now to Fig. 1, the outputs of circuits 18 and 19 are applied to differential error circuit 20. Fig. 3 shows a circuit which may be used as the differential error circuit 20. In the circuit of Fig. 3, the initial conditions are such that electron tubes 39 and 40 are not conducting current. If a pulse is applied across terminals 35 and 36, and if a pulse of approximate equal amplitude but of different width is applied across terminals 37 and 38, more current will attempt to flow through one of electron tubes 39 and 40 than through the other, thus creating a voltage to be used as an output. Capacitor 41 serves to by-pass short pulses coming from pulse stretcher circuit 18.

The output of differential error circuit 20 is applied to connector circuits 21 and 22 connected in series. Connector circuits 21 and 22 may consist of circuits similar to that shown in Fig. 4. In Fig. 4, electron tube 60 is connected back to back with tube 61, the cathode of each tube being connected to the plate of the other. A common input connection from the error circuit 20 or connector circuit 21 is provided at 20A. Energizing potentials for the connector or clamping circuit are available from the respective preceding circuit, such as the error circuit 20. Between the cathode and the grid of tube 60, there is provided a source of D.-C. potential 62 in series with resistor 64 and secondary winding 66 of transformer 59. Between the cathode and grid of tube 61 is similarly connected a source of D.-C. potential 63, resistor 65 and secondary winding 67 of transformer 59A. Tubes 60 and 61 are consequently biased to cutoff unless a pulse is supplied to their grids through transformer 59A from a gate generator, as at 54 permitting them to conduct and enabling current to flow in either direction. The output terminal of the circuit is indicated at 22A which may be connected to the connector 22 or to the memory circuit 23.

The output of connector 22 is applied to memory circuit 23. This circuit may be constructed as set forth in Fig. 5. In Fig. 5, the signal or error voltage is applied to terminal 68 and, during the duration of said error voltage, capacitors 69 and 70 charge with the charging current flowing through resistor 71. The charge on capacitor 69, serving as bias for electron tube 72, controls the amount of plate current flowing through this tube and thus the amount of current through resistor 73. When the potential at the end of resistor 73 connected to resistor 74 rises above the charge on capacitor 70, current flows through resistor 74 to increase the charge on capacitor 70. Connected to the plate of tube 72 is shown a source of voltage 75. Switches 76, 77, and 78 are mechanically connected together and represent a single throw triple-pole device which is normally open but when closed permits manual setting of the bias by moving the sliding contact on potentiometer 79 which has connected across it sources of voltage 80 and 81.

The manner in which memory circuit 23 operates may be explained with reference to Fig. 5. The voltage charge across capacitor 69 is proportional to the error voltage. If this is a large voltage, tube 72 conducts more readily and the potential at terminal 82 will rise rapidly. The potential at terminal 82 rises or falls in an exponential manner due to the charge or discharge of capacitor 70. The grid of tube 72 rises with the cathode as the grid is connected to the cathode by resistors 71 and 74 and capacitor 69.

Thus, it will be seen that a positive error voltage applied at terminal 68 will produce an output voltage at terminal 82, said output voltage increasing at a rate depending on the magnitude of the error voltage. A negative error signal at terminal 62 will produce a similarly decreasing output voltage. Said increase or decrease in output voltage will continue for a time long compared to the interrogation period.

When switches 76, 77, and 78 are closed, resistor 74 is shorted and it is possible to control the voltage at terminal 82 by regulating potentiometer 79. Switch 77 prevents power loss from sources 80 and 81 when potentiometer 79 is not being used. The output of memory circuit 23 is applied to the range indicator 24 and also to adjust the bias of rectangular wave generator 10.

The output of rectangular wave generator 50 is applied to trigger pulse generator 51, the output of which is applied to gate generator 52. The output of gate generator 52 is applied, along with the video signal, to coincidence circuit 53, the output of which is applied to gate generator circuit 54. Rectangular wave generator 50, trigger pulse generator 51, gate generator 52, coincidence circuit 53, and gate generator 54 are respectively similar in construction and operation to rectangular wave generator 10, trigger pulse generator 11, gate generator 14, coincidence circuit 16 and gate generator 14 described above. Rectangular wave generator 55, trigger pulse generator 56, gate generator 57, coincidence circuit 58, and gate generator 59 are similar in construction and operation to the corresponding components 50—54 described above. The outputs of gate generator 54 and 59 are applied to connector circuits 21 and 22 respectively. In the explanation of the operation of this invention, reference will be made to the curves in Fig. 6.

The interrogating pulse from the airborne or shipborne transmitter is shown as 80 in Fig. 6A. The fixed beacon on being interrogated transmits code pulses 81, 82, and 83; the distance between these pulses being arranged in accordance with a predetermined code. Pulse 80 on being applied to generator 10 initiates the production of rectangular wave 84 shown in Fig. 6B. The width of this wave is adjusted by the bias supplied from memory circuit 23 to be somewhat less in duration than the interval between pulses 80 and 81. The application of rectangular wave 84 to trigger pulse generator 11 results in the production of trigger pulses 85 and 86 as shown in Fig. 6C. Pulse 85 is ineffective to operate narrow gate generator 14 but pulse 86, of opposite polarity, operates narrow gate generator 14 to produce pulse 87 of Fig. 6D. Pulse 87 is applied to delay circuit 15 to produce delayed pulse 88 also shown in Fig. 6D. Pulses 87 and 88 along with the video signal containing pulses 80, 81, 82, and 83 are applied to coincidence circuits 16 and 17. If pulse 81 falls midway between pulses 87 and 88, the outputs of coincidence circuits 16 and 17 will be equal, resulting in no error voltage being produced by differential error circuit 20. If pulse 81 coincides more nearly with one of the two pulses 87—88 than with the other, a larger pulse will be produced by one of the two pulse stretcher circuits 18 or 19, than is produced by the other. These unequal outputs are applied to the circuit 20, resulting in the production of a differential error voltage, similar to pulse 90 shown in Fig. 6F.

The center point of delay network 15 is tapped to provide a range marker pip 89, shown in Fig. 6E, midway between pulses 87 and 88. This pip may be used to indicate the range of the fixed beacon.

Pulse 85 generated by circuit 11 has no effect on generator 50 and 55, but pulse 86 of opposite polarity causes generator 50 and 55 to produce pulses 91 and 92, as shown in Figs. 6G and 6J respectively. The lengths of pulses 91 and 92 are preset to be equal to the interval between pulses 81 and 82 and between 81 and 83 respectively. Trigger pulse generator 51 and gate generator 52 operate to produce a pulse 93 shown in Fig. 6H at the trailing edge of pulse 91. Pulse 93 along with the video signal received from the fixed beacon is applied to coincidence circuit 53. If pulse 82 coincides with pulse 93, a pulse is applied to gate generator 54 which produces a somewhat larger pulse, shown at 94 in Fig. 6I. Pulse 94 is applied to connector circuit 21 rendering that circuit conductive to the differential error voltage developed by circuit 20. Pulse 92 through the action of trigger pulse generator 56 and gate generator 57 produce gating pulse 95, shown in Fig. 6K, at the trailing edge of pulse 92. When pulse 83 and 95 coincide, a pulse is applied to generator 59 which produces a somewhat longer pulse, as shown at 96 in Fig. 6L. Pulse 96 is applied to connector circuit 22 which is rendered conductive to allow the error voltage developed by differential error signal 20 to pass to memory circuit 23.

Memory circuit 23 produces a voltage wave indicative of the range to the fixed beacon. This range voltage varies in accordance with the error voltage generated by circuit 20. If the beacon is interrogated intermittently, memory circuit 23 develops a voltage between the coded replies, said voltage being indicative of the range determined by the last reply.

Referring to Fig. 5, the rate at which capacitor 70 changes its charge is proportional to the velocity of the moving interrogator with respect to the beacon. The time constant of the circuit containing capacitor 70 is approximately equal or larger than the longest time interval between successive appearances of the video signal permitting capacitor 70 to change its voltage; thus, changing the bias on wave generator 10 in relation to the rate of change of the distance between the interrogator and the fixed beacon which results in velocity memory. If the rate of change of the distance between interrogator and the beacon remains constant, the memory circuit will anticipate the change in distance between successive interrogations and position pulses 87 and 88 so that pulse 81 falls between them.

Referring to Fig. 5, it will be noted that when switches 76, 77, and 78 are closed the position of pulses 87 and 88 may be controlled manually as the voltage at terminal 82 may be varied, thus permitting the beacon to be searched for and, after finding the beacon, upon proper positioning of gates 87 and 88, opening switches 76, 77, and 78 will permit the beacon to be tracked automatically.

Consideration of Fig. 1 as above described will disclose that the primary circuit arrangement is what may be termed a closed loop range tracking circuit. This closed loop circuit is comprised of a delay portion for the reference pulse, the units 10 and 11, a gating and mixing portion where the coded sequence of reply pulses or video signal is introduced, the units 14, 16, 18 and 15, 17, 19, the error signal portion 20, two connector circuits 21 and 22 and the memory circuit portion 23, an output of which is coupled back to an input of unit 10 thus completing the loop.

The connector means 21 and 22 may be termed disabling or enabling means interposed between 20 and 23.

From the above it will be evident that in accordance with the present invention there is disclosed a system for continuously measuring at one station the distance to a particular one of a plurality of stations comprising at the one station means for transmitting interrogating pulses at a regular repetition rate. Also provided are means for receiving reply pulses from any of the referred to stations, the reply pulses from each station comprising a different coded sequence of pulses recurrent at the repetition rate. Also provided are means for selectively tracking the reply pulses of the particular one of the stations to provide a potential representing the distance to that station. The selective tracking means comprise a closed loop tracking circuit responsive to the first pulse of a sequence of reply pulses. Also provided are means interposed normally to disable the tracking circuit and means selectively responsive to the time spacing of the subsequent pulses of a sequence for enabling the circuit and means for adjusting the time selectivity of the selectively responsive means to enable the circuit when the coded sequence of pulses for the particular station are received.

While there has been described what is at present considered to be the preferred embodiment of this invention, it will be obvious to those skilled in the art that various changes and modifications may be made therein without departing from the invention as set forth in the appended claims.

The invention claimed is:

1. In a device for continuously indicating the time of arrival of a series of pulses, means for indicating said time, means for predicting the time of the next arrival of said pulses, means arranged to measure the time of arrival of the first of said series with respect to the predicted time of arrival, first and second means for connecting the measuring means with said indicating and predicting means, means for causing the first connector means to be conductive if a second pulse arrives at a predetermined time after said first pulse, means for causing the second connector means to be conductive if a third pulse arrives at a predetermined time after said first pulse, means for adjusting said measuring means and said predicting means in accordance with the predicted arrival.

2. A first means for producing a voltage varying in accordance with the time of arrival of a first pulse, the output of said first means being connected through first and second connector means to a utilizing circuit, means for causing the first connector means to pass said voltage if a second pulse arrives at a predetermined time after said first pulse, means for causing the second connector means to pass said voltage if a third pulse arrives at a predetermined time after said first pulse.

3. A system for continuously measuring at one station the distance to a particular one of a plurality of stations comprising at said one station means for transmitting interrogating pulses at a regular repetition rate, means for receiving reply pulses from any of said stations, said reply pulses from each station comprising a different coded sequence of pulses recurrent at said rate, means for selectively tracking reply pulses of said particular one of said stations to provide a potential representing the distance to said station comprising a closed loop range tracking circuit responsive to the first pulses of a sequence of reply pulses, means interposed normally to disable said tracking circuit, means selectively responsive to the time spacing of the subsequent pulses of a sequence for enabling said circuit and means for adjusting the time selectivity of said selective responsive means to enable said circuit when the coded sequence of pulses for said particular station is repeated.

4. A system as in claim 3 wherein at said one station there are provided means for generating a reference pulse recurrent at said repetition rate, means comprising said tracking circuit for producing a pulse delayed by an amount to produce coincidence with a first sequence pulse and a plurality of adjustable delay circuits corresponding to the subsequent pulses in a sequence for producing a corresponding plurality of gating pulses delayed respectively to produce coincidence with said subsequent pulses.

5. A system as in claim 4 wherein said closed loop tracking circuit comprises means for delaying said reference pulses, means responsive to said delayed reference pulse for producing a pair of gate potentials, comparison means responsive to said gate potentials and the said first pulse of a sequence for producing an error potential, means comprising a memory circuit for producing a potential proportional to range, means for utilizing said range potential to adjust said delay means and connector means interposed between said comparison means and said memory circuit means.

ANDREW B. JACOBSEN.

REFERENCES CITED

The following references are of record in the file of this patent:

UNITED STATES PATENTS

| Number | Name | Date |
|---|---|---|
| 1,924,174 | Wolf | Aug. 29, 1933 |
| 2,089,639 | Bedford | Aug. 10, 1937 |
| 2,266,401 | Reeves | Dec. 16, 1941 |
| 2,361,437 | Trevor | Oct. 31, 1944 |
| 2,415,359 | Loughlin | Feb. 4, 1947 |
| 2,422,074 | Bond | June 10, 1947 |
| 2,433,667 | Hollingsworth | Dec. 30, 1947 |
| 2,483,594 | Oliver | Oct. 4, 1949 |
| 2,516,356 | Tull | July 25, 1950 |
| 2,531,412 | Deloraine | Nov. 28, 1950 |
| 2,538,027 | Mozley et al. | Jan. 16, 1951 |

FOREIGN PATENTS

| Number | Country | Date |
|---|---|---|
| 528,192 | Great Britain | Oct. 24, 1940 |